Sept. 8, 1959 G. H. RIDINGS 2,903,517
RECORD COMMUNICATION-TELEPHONE SYSTEM
Filed April 7, 1955 3 Sheets-Sheet 1

INVENTOR.
G. H. RIDINGS
BY Edward R. Hyde Jr.
ATTORNEY

RECORD COMMUNICATION-TELEPHONE SYSTEM

INVENTOR.
G. H. RIDINGS
BY Edward R. Hyde Jr.
ATTORNEY

RECORD COMMUNICATION-TELEPHONE SYSTEM

Filed April 7, 1955 3 Sheets-Sheet 3

INVENTOR.
G. H. RIDINGS
BY Edward R. Hyde Jr.
ATTORNEY

United States Patent Office 2,903,517

Patented Sept. 8, 1959

2,903,517

RECORD COMMUNICATION-TELEPHONE SYSTEM

Garvice H. Ridings, Summit, N.J., assignor to The Western Union Telegraph Company, New York, N.Y., a corporation of New York Application April 7, 1955, Serial No. 499,915

9 Claims. (Cl. 179—4)

The present invention relates to record communication and more particularly to a record communication system uniquely adapted to be used with a standard telephone circuit.

It has been proposed heretofore to connect facsimile machines to conventional telephone circuits without interrupting the circuits by a direct conductive connection. A facsimile machine is installed in the premises of a telephone patron and by inductive or acoustical means the telephone is coupled to the facsimile machine. Thus the patron whose business requires record communications may utilize his telephone line for both voice and visual communication.

This invention provides such a system for transmitting facsimile messages between a central office and patron outstations. Since the connection between the central office and the patron is made through the telephone lines and networks, the length of line used to effect the connection will vary and will not be under the control of the facsimile operator. For example, when the facsimile operator obtains a connection with a particular patron by dialing the latter's telephone number, the connection is made over any one of a number of alternate telephone circuits depending upon the availability of the telephone lines at the time. If the most direct connection is in use because of other telephone calls, the connection will be made over other available circuits. Thus the line length between the central office and a particular patron may vary at different times.

Another important consideration in such a system is to insure that the telephone handset is replaced on its cradle after it has been used for facsimile transmission. If the patron fails to replace the handset, the telephone line remains in a busy condition and will fail to respond to other incoming calls.

As herein used the term central office refers to a telegraph center which for the purposes of the description of the present invention is equipped with a facsimile transmitter and recorder. The central office is further equipped with a standard telephone by which connection is made with any one of a plurality of patron stations. Each patron has a facsimile transceiver and a standard telephone whereby facsimile transmission may be made in either direction between the central office and each patron.

It is therefore an object of this invention to provide a record communication system for use over standard telephone lines wherein signal level may be adjusted in accordance with line length.

Another object of the present invention is to provide a facsimile system wherein a transceiver at an outstation initially sets up as a transmitter regardless of whether a message is to be received or transmitted by the outstation.

Another object of the present invention is to provide a facsimile system incorporating standard telephone circuits wherein a test signal is transmitted for the purpose of checking signal strength.

A further object of this invention is to provide a record communication system employing standard telephone equipment wherein the telephone handset is automatically replaced on its cradle at the conclusion of facsimile transmission.

A further object of this invention is to provide a record communication system to be used with standard telephone equipment wherein the circuit automatically sets up for telephone communication at the conclusion of record transmission.

These and other objects of the present invention will become apparent from the following description taken with the drawings in which.

Figure 1:
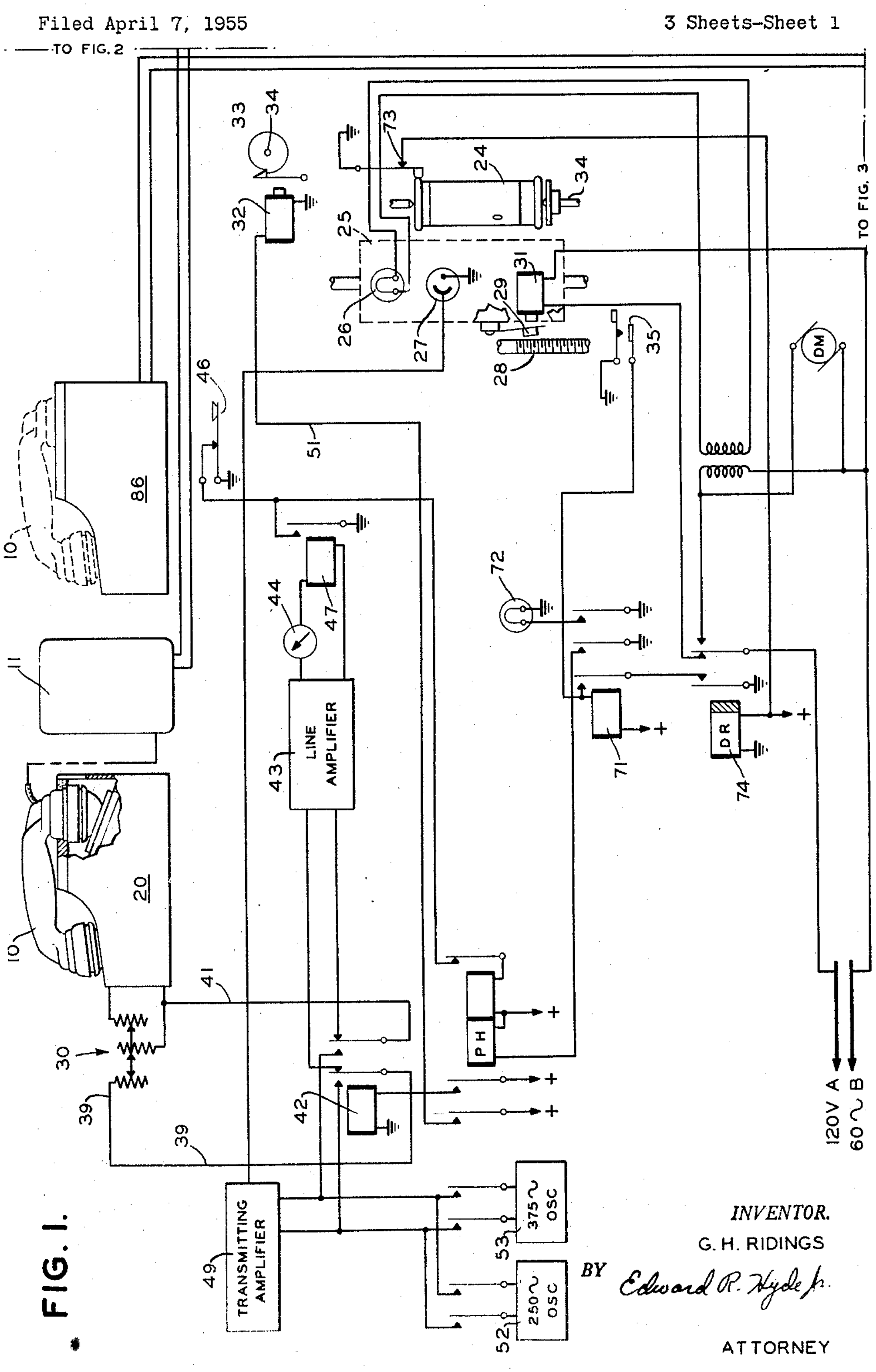
Fig. 1 is a schematic diagram of the central office transmitter and a standard telephone set.

In accordance with the above objectives the present invention employs signal test pulses to check the signal level of the message signals for the purpose of adjusting for line length. When a message is to be transmitted from the central office, the operator will dial the phone number of the patron outstation for which the message is destined. The patron upon being informed that a message is to be transmitted will thereupon mount a message blank around the drum of his transceiver and engage the handset of his telephone with a coupling device to connect the telephone line to the transceiver. The power switch is then turned to the "on" position to cause the transceiver to set up as a transmitter and signal pulses are transmitted from the patron's outstation over the telephone line and received at the central office transmitter. These signal pulses serve to actuate an indicating device whereby the operator at the central office can observe the signal level which will be a function of the line length connecting the two machines. If an adjustment is necessary it is accomplished by setting an H-pad which is interposed in the line at the central office transmitter. Adjusting this pad changes the effective line length to bring the signal level up to the desired point. The central office operator then applies two tone signals to the line, one of which changes the patron's transceiver over from a transmitter to a receiver and the second of which causes the transceiver to start scanning.

Similarly, in transmitting from a patron's outstation to the central office, a telephone connection is first made and the central office operator is informed that a message is to be transmitted. The central office operator engages his telephone handset with a coupling device to connect the telephone line with his recorder. The patron similarly engages his handset with a coupling device which connects to the transceiver. The patron's power switch is then turned to the "on" position and the machine again sets up as a transmitter. Signal test pulses are immediately sent out over the line and are received by the central office recorder where an indicating device is actuated to indicate signal level. The central office operator observes the indicating device and again adjusts an H-pad to compensate for variations in line length. Being satisfied with the adjustment the central office operator thereupon applies a tone signal to the line which causes the patron's transceiver to start scanning. It is seen that the patron's transceiver will initially set up as a transmitter regardless of the direction in which the message is to be transmitted. The reason for this is that it is necessary to initially send out signal test pulses from the patron's machine to the central office where the necessary adjustments are made.

The coupling device at the patron outstation is located adjacent the handset cradle and an electrically operated mechanism is provided to raise the coupling device when the facsimile transceiver is energized. At the conclusion of facsimile transmission, the coupling device is lowered when the transceiver is turned off. Lowering of the coupling device automatically repositions the telephone handset on its cradle to actuate the handset switch to the normal standby condition. Thus the telephone circuit is reestablished and prepared to respond to an incoming telephone call.

Referring now to the drawings, there is shown a telephone system comprising a handset 10 and bell box 11 located at the central office and another handset 12 and bell box 13 located at the patron's outstation. These telephones are connected together through a telephone network, herein represented by telephone exchange 14. The patron's transceiver 15 is of the type wherein a message blank is wrapped about a rotatable drum 16 which is scanned by an optical system including an exciter lamp 17 and photocell 18 in the case of transmitting. For receiving purposes the message blank is scanned by an electric stylus 19. A drum motor DM causes the drum 16 to rotate at a fixed synchronous speed and a drum feed motor FM feeds the drum axially past the scanning devices. The stylus 19 is connected to the line through a receiving amplifier 21 and the photocell 18 is connected to the line through the transmitting amplifier 22. For the purposes of this description, it may be assumed that the construction of the patron's machine is like that set forth in the U.S. patent application of Wise et al., Serial No. 224,926, filed May 7, 1951, to which reference may be had. A coupling device 23 and **23*a* is provided which serves to couple the telephone handset 12 to the transceiver 15**. The coupling device may be of the acoustical type shown for example by U.S. Patent No. 2,209,327 of d'Humy. Alternatively the coupling may be electromagnetic in which case the coupling mechanism may take the form of that shown in U.S. Patent No. 2,179,445 of Cooley. The details of the coupling device form no part of the present invention and reference may be had to the last two cited patents for the structural details thereof.

The transmitter at the central office is connected to a coupling device 20 which may be of the type shown in the d'Humy or Cooley patents. Facsimile machine 23 is of the type shown in U.S. Patent No. 2,657,259 of J. H. Hackenberg. For the purpose of the present specification there is indicated schematically such parts as are necessary for a proper understanding of this invention. Reference may be had to the Hackenberg patent for the structural details of the transmitter. The transmitter has a removable drum 24 which carries the message sheet to be scanned by an optical scanning mechanism mounted on a vertically slidable carriage 25. The scanning mechanism is represented by an exciter lamp 26 and a photocell 27, the operation of which is well understood in facsimile work. The carriage 25 carries a half-nut 29 mounted on a flexible spring which urges the half-nut into engagement with a rotary feed screw 28. A synchronous motor DM drives both the drum 24 and the feed screw 28 at synchronous speed. A magnet 31 when energized holds the half-nut away from the feed screw to prevent feeding of the scanning carriage, and a phasing magnet 32 is energized to release stop disk 33 to clutch the drum motor DM to the drum shaft 34. When the scanning carriage has moved through its entire path of travel, it closes a normally open switch 35 which will be called the end-of-message switch.

When the operator at the central office has a message destined for a particular patron, he establishes a telephone connection in the usual manner and informs the patron that a message is to be transmitted. The handset 10 at the central office is then placed in engagement with coupling device 20 and the handset 12 at the patron's station is placed in operative engagement with coupling device 23, **23*a* in a manner to be described hereinafter. The patron will then wrap a message blank about the drum 16 and close power switch 36 which connects bus bar A to line A'. The source of power for the transceiver may be a 120 volt 60 cycle source connected to bus bars A and B. Upon closing the power switch, drum motor DM at the transceiver is energized to rotate the scanning drum. Also, power is supplied to the transmitting amplifier 22 and to the light source 17. A black scanning mark on the upper right hand corner of the message blank results in periodic actuation of photocell 18 which sends test pulses to the telephone line through the transmitting amplifier 22, wires 37 and 38 and coupling device 23, 23*a*. These pulses are received at the central office and passed through bell box 11, handset 10, coupling device 20, H-pad 30, lines 39, 41, transfer contacts of relay 42 and line amplifier 43 to an indicating device 44. The indicating device will respond to the transmitted test pulses and will give an indication of the strength of the received signals. The operator observing meter 44 will determine whether or not pad 30 need be adjusted to compensate for line length. As discussed above, the length of the line connecting the central office to the patron will vary from time to time depending upon the telephone network through which the connection is made. If the line length is unduly long, the signal level of the test pulses from the patron's outstation will be below the optimum value. Hence pad 30 is adjusted to compensate for the extended line length. After proper adjustment of the pad has been made, the operator at the central office presses button 46 which removes one ground from phase relay PH. A relay 47 in series with meter 44 follows the received periodic test pulses from the patron's machine. After switch 46 is opened, the next time that relay 47 releases to open its contact a second ground is removed from one side of phase relay PH, resulting in deenergization thereof. When the phase relay deenergizes, it opens one of its contacts which prevents reenergization when switch 46 is released. Another contact of the phase relay closes to energize relay 42 which thereupon connects wires 39, 41 to transmitter amplifier 49. Another contact of the phase relay energizes phase magnet 32 over wire 51 to clutch the drum shaft to the drum motor to permit the drum to rotate at synchronous speed. An oscillator 52, which may be tuned to a frequency of 250 cycles, is applied to the line by the release of the phase magnet. Similarly, a second oscillator 53**, which may be tuned to a frequency of 375 cycles, is also applied to the outgoing line by the release of phase magnet PH.

At the patron's transceiver the 250 cycle tone is applied to the grid of a vacuum tube 54 through a coupling transformer 55. A tuned circuit comprising capacitor 56 and inductor 57 is connected in the plate circuit of the vacuum tube and tuned to a frequency of 250 cycles. When the 250 cycle tone from the transmitter is applied across this tuned circuit, the starting anode of a gas tube 59 is made sufficiently positive to cause conduction thereof. Similarly, a tuned circuit comprising capacitor 61 and inductor 62 responds to the 375 cycle signal to fire a second gas tube 63. A relay 64 in the plate circuit of tube 63 will energize to transfer a ground from the transmitting amplifier 22 to the receiving amplifier 21. Another contact of relay 64 will open the energizing circuit for exciter lamp 17 which thereupon extinguishes. The energizing circuit for stylus motor SM is partially completed by a make contact of relay 64. The stylus motor serves to position the stylus in scanning position on the message drum. It is seen therefore that the firing of tube 63 as the result of the 375 cycle tone transfers the transceiver from its transmitting condition to a receiving condition.

A relay 65 in the plate circuit of gas tube 59 is energized to close a contact completing a circuit for stylus motor SM and drum feed motor FM which may be traced from bus bar B, the stylus and feed motors, wire 66, a closed contact of relay 65, wire 67, and a contact of relay 68 to line A'. Relay 68 is a heat relay which closes its make contact a short time after the receiving amplifier is energized thus insuring that the amplifier is prepared to function when the drum feed motor is energized to initiate scanning. Scanning will now take place and the intelligence signals will be received at the patron's station over the telephone line and applied to receiving amplifier 21 through a band pass filter 69. The filter is designed to pass signals within the frequency range of 500 cycles to 4000 cycles, thus preventing the two tone signals from passing through the receiving amplifier.

Referring back to the transmitter at the central office, the end-of-message switch 35 will close at the end of the scanning of the message blank to energize relay 71 which closes its contacts to complete circuits for end-of-message lamp 72 and the phasing relay PH. The oscillators 52 and 53 are thereupon disconnected from the line and relay 42 is deenergized along with phase magnet 32. Upon release of the phase magnet, stop disk 34 is reengaged to disconnect drum shaft 34 from drum motor DM. Deenergization of relay 42 transfers its contacts to reconnect the line amplifier to the line and disconnect the transmitting amplifier. Drum 24 is manually taken out of the machine and the transmitted message blank is removed therefrom. Switch 73 is opened to remove a ground from a slow-release relay 74 which thereupon energizes to deenergize the drum motor DM and apply a ground to one side of the end-of-message relay 71 so that the latter will remain energized when the end-of-message switch 35 is opened by the repositioning of the scanning carriage.

As the scanning drum at the patron's transceiver reaches the end of its travel, it actuates an end-of-message switch 80 to complete a circuit for buzzer 81. Sounding of the buzzer indicates to the patron that the message has been sent and he thereupon may open power switch 36. This disconnects bus bar A from line A' to deenergize the drum feed motor and the stylus motor. The plate circuits of tubes 59 and 63 are also opened to permit these tubes to extinguish to deenergize relays 65 and 64. The transceiver thereby reverts to its standby condition.

Transmission from the patron to the central office will now be considered. A recorder 82 at the central office connects through lines 83, 84 and an H-pad 85 to a coupling device 86. The coupling device may be of the same construction as coupling device 20 which is connected to the central office transmitter. The recorder is of a continuous paper feed type such as shown in the U.S. patent of Hallden and Zabriskie No. 2,639,211. For the purpose of this description there is shown schematically only such parts as are necessary for a proper understanding of the present system. There is a flat stationary platen 87 over which the recording paper 88 is fed from a supply roll 89 by a feed roller 91 operated by feed motor FM. A stylus 92 fastened to a stylus belt 93 is passed across the surface of the paper and operated by stylus motor SM. The connection between the stylus belt and the stylus motor is such that the belt will not operate unless a stop disk 94 is released. The disk is normally locked in position by a pivoted arm 95 which is controlled by a phase magnet 96. Received message signals are passed through a band pass filter 97 to an amplifier 98 where they are amplified and inverted and applied over line 99 to the stylus. The filter is tuned to pass frequencies between 500 and 4000 cycles.

When the patron has a message to transmit to the central office, he will wrap the message blank about the scanning drum of the transceiver and establish a connection with the central office by the telephone circuit in the usual manner. The transmitting message blank differs from a receiving message blank in that the former has a black area substantially the entire length thereof along one side. This causes signal pulses to be transmitted with each revolution of the drum during the entire period of message transmission. After the central office operator is informed that the patron has a message to transmit, he engages his telephone headset 10 with coupling device 86. The patron turns his power switch 36 to the On position and the transceiver is set up as a transmitter just as in the case when the patron is to receive. Signal test pulses are transmitted over the telephone circuit and are received at the central office where they are passed through coupling device 86, H pad 85, filter 97, amplifier 98 to relay 101 which will follow the pulses. Since these pulses are received throughout message transmission, relay 101 will continue to pulse all during transmission. A meter or indicating device 102 is connected in series with relay 101 in the output of amplifier 98. The operator, by observing the indications on meter 102 determines whether or not the received pulses are of the proper signal strength. If an adjustment is necessary to compensate for line length, pad 85 is manually operated to obtain optimum signal strength. After this adjustment is made and the operator is satisfied with the signal strength of the received pulses, he depresses a phasing switch 103 to remove one ground from normally operated phasing relay 104. Pulsing relay 101 periodically closes a pair of make contacts which complete a circuit for timer 105. This timer is of conventional construction and commercially available and is such that relay 106 is made to energize and remain continuously energized as long as relay 101 continues to pulse. Operation of relay 106 applies a shorting ground to slow-release relay 107 which thereupon deenergizes to open its contact to remove a ground from one side of phasing relay 104. The next time that relay 101 releases, it opens one of its contacts to remove the last holding ground of the phase relay which thereupon releases.

With the release of relay 104, a circuit is completed for feed motor FM which commenses to feed the strip of paper 88 over the platen 87. Another contact of the phase relay 104 applies a ground to one side of the phase magnet 96 which operates to raise the pivoted arm 95 to connect the stylus belt with stylus motor SM. The details of this mechanical connection are shown in the above-mentioned Hallden et al. patent. An oscillator 109 tuned to 250 cycles is applied to lines 83, 84 to transmit a tone over the telephone circuit to the patron's transceiver to fire tube 59. It is recalled that conduction of this tube results in message scanning at the transceiver. With the start of scanning, the intelligence signals are transmitted over the line to the stylus 92 at the recorder. Transmission will continue until the patron shuts down his machine, at which time the test pulses stop and relay 101 at the recorder stops pulsing. Relay 106 thereupon deenergizes to open the circuit of the stylus motor SM and complete a circuit for end-of-message lamp 108. This indicates to the central office operator that message transmission has been completed. The release of relay 106 also removes a shorting ground from relay 107 which energizes to cause its contact to complete a circuit for phasing magnet 104. Operation of the phasing magnet disconnects oscillator 109 from the line and deenergizes paper feed motor FM. A transfer contact of the phase relay opens a circuit of phase magnet 96 which releases to permit arm 95 to reengage with stop disk 94. The recorder thereby reverts to its normal standby condition.

Figure 2:
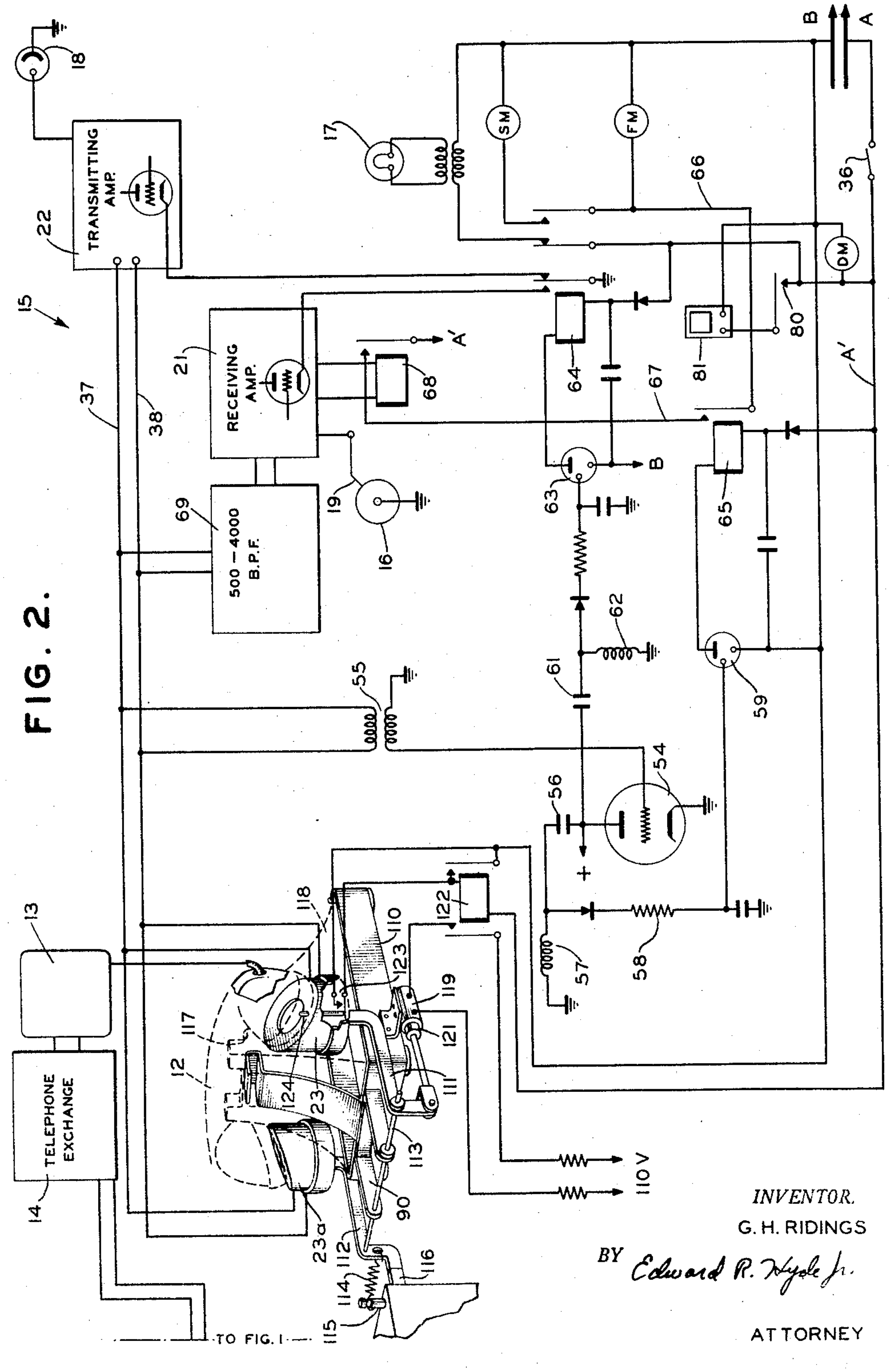
Fig. 2 is a schematic diagram of the facsimile recorder at the central office.

Reference will now be made to Fig. 2 in describing the arrangement for restoring the telephone circuit to the standby condition at the termination of facsimile transmission. The coupling device at the patron station is constructed of two sections 23 and 23*a*. Section 23 is adapted to engage the ear piece of handset 12 and section 23a the mouthpiece of the handset. Coupling device sections 23 and 23a are suitably secured to the ends of levers 111 and 112 respectively. These levers are secured to a rod 113 which is pivotally mounted by a U-shaped bracket 90. The bracket is in turn secured to a mounting device 110 which attaches to the telephone base 118. Mounting device 110 comprises a U-shaped portion which fits around the back and two sides of base 118 and an arm 11a extending generally upward. The arm is curved to coincide with the contour of the back of the telephone base and terminates in a clip which is received in the handle depression in the base. The ends of the U-shaped portion of the mounting device are bent to fit around the front of the base. Mounting device 110 may be made of spring steel to securely clip onto the telephone base as shown in the drawing. The assembly comprising levers 111, 112 and rod 113 is urged in a clockwise direction by spring 114 one end of which is fastened to an arm of lever 112, the other end being anchored in any convenient manner as by pin 115. A stop 116 limits the clockwise rotation of the lever assembly. It is seen from Fig. 2 that the telephone cradle 117 and cradle base 118 is located between levers 111 and 112. With the handset positioned on the coupling device 23, 23a and the lever assembly turned in the clockwise direction by spring 114 the handset will rest in its normal position in cradle 117. In this position the handset switch located in the cradle is actuated and the telephone circuit is in the standby condition to respond to an incoming call. A solenoid 119 has an armature 121 linked to the depending arm of lever 111. When solenoid 119 is energized it retracts its armature against the action of spring 114 to rotate the lever assembly and raise the coupling device 23, 23a to lift the handset off the cradle 117. Solenoid 119 is connected to a local 110 volt A.C. source through a set of contacts of relay 122. One side of relay coil 122 connects directly to line A' and the other side connects to bus bar B through a switch 123 located within coupling device 23. This switch is of conventional construction and is actuated by a pin 124 projecting up through the casing of the coupling device. With the hand set positioned on the coupling device, the pin 124 is depressed to maintain the switch in an open position. When the handset is lifted off the coupling device, switch 124 is permitted to close.

In normal standby condition power switch 36 of the patron's transceiver is open, relay 122 and solenoid 119 are deenergized and the telephone handset 12 rests on cradle 117. When a message is to be transmitted to the central office, the operator at the patron station will remove the handset from its cradle and inform the central office operator. Power switch 36 is then closed to energize transceiver 15 and relay 122. It should be noted that the relay would not energize upon the closing of switch 36 had not the handset first been lifted to permit switch 123 to close. When relay 122 energizes, a pair of contacts completes the circuit for solenoid 121 which rocks levers 111 and 112 in a counterclockwise direction as viewed in Fig. 2. This action elevates coupling device 23, 23a so that the handset 12 may be positioned thereon without closing the telephone switch located within cradle 117. Another pair of contacts of relay 122 close to shunt switch 123 whereby relay 122 is maintained operated as long as transceiver 15 is energized. The telephone handset 12 is then positioned to engage the coupling device and transmission takes place as described above. At the termination of facsimile transmission, the transceiver is shut down by opening the power switch 36. This also deenergizes relay 122 which opens its contacts to release solenoid 119. Levers 111 and 112 thereby pivot under the action of spring 114 to lower the handset 12 down onto the cradle 117. In this manner the telephone circuit is returned to the standby condition when the operator turns off the facsimile machine.

Figures 3, 4:
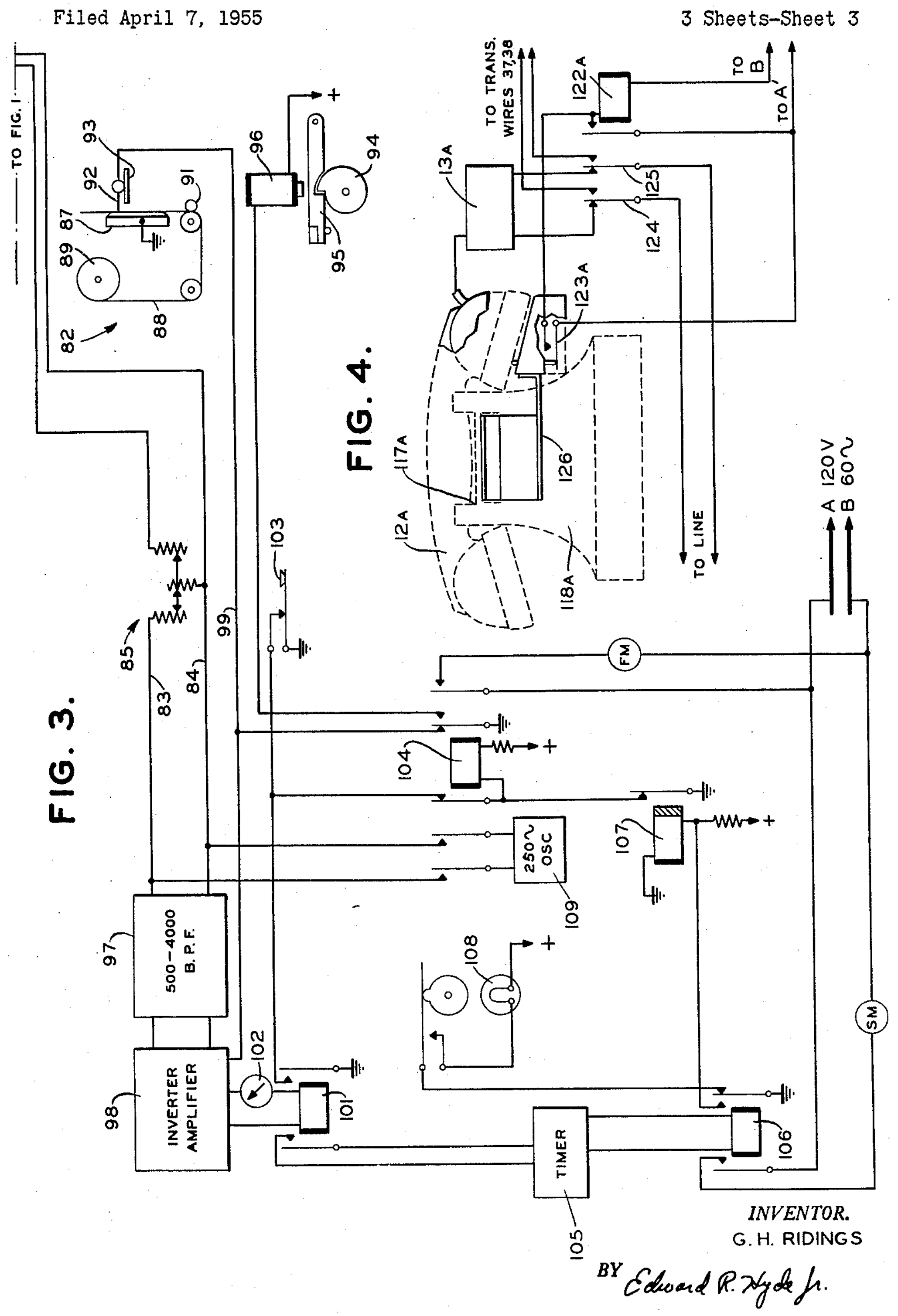
Fig. 3 is a circuit diagram of the patron's transceiver and shows diagrammatically an arrangement for automatically restoring the telephone circuit to the normal standby condition at the end of facsimile transmission.
Fig. 4 shows a modification of the arrangement of Fig. 3.

Fig. 4 shows a modification wherein the patron's transceiver may be directly coupled to the outgoing line without employing an inductive or acoustic coupling device. For convenience of description the elements of this modified system will be given the same numerical designations as their corresponding elements of Fig. 2 followed by the letter A. Thus in Fig. 4 handset 12A corresponds to handset 12 of Fig. 2. The leads from bell box 13A connect to a pair of break contacts of relay 122A and the transceiver leads 37, 38 connect to a corresponding pair of make contacts. The center contacts 124 and 125 connect to the outgoing line. One side of relay 122A is jointed to bus bar B and the other side thereof connects to line A' through switch 123A. This switch is secured to a bracket 126 which may clip into the handle depression on the telephone base 118A and is maintained open when the handset 12A is resting on the cradle. Switch 123A functions in the same manner as switch 123 in that it prevents operation of relay 122A unless the handset is first lifted off the cradle. With relay 122A deenergized the telephone equipment is connected to the line through transfer contacts 124, 125. When facsimile transmission is to take place, the handset is lifted and power switch 36 of the transceiver is closed to energize the facsimile machine and operate relay 122A. Transfer contacts 124, 125 will thereupon disconnect the telephone equipment from the line and connect the transceiver thereto. Another contact of relay 122A will close to shunt switch 123A so that the handset 12A may be replaced on its cradle without deenergizing relay 122A. When the transceiver is shut down at the end of facsimile transmission, relay 122A will deenergize to reconnect the telephone to the outgoing line. It is seen therefore that the telephone circuit is maintained in the standby condition at all times when the facsimile transceiver is not in operation.

Though the present invention has been disclosed with reference to a specific embodiment thereof, it is understood that this is not to be considered as limiting the scope of the invention as defined in the appended claims.

What is claimed is:

1. In a communication system for transmitting facsimile signals between a central office and a patron station, a facsimile transmitter at the central office, a telephone network including a first telephone set located at the central office and a second telephone set located at the patron station whereby telephonic communication may be established therebetween, means including impedance means to couple said transmitter to said first telephone set, a rotary drum facsimile transceiver at the patron station, said transceiver including a transmitting amplifier, optical scanning means connected to said transmitting amplifier, a receiving amplifier, stylus scanning means connected to said amplifier, means to couple said transceiver to said second telephone set, means to energize said transceiver, means whereby energization thereof initially energizes said transmitting amplifier and sets the transceiver up as a transmitter to send test pulses to the central office transmitter, means responsive to the test pulses to indicate the signal level thereof and means to adjust said impedance means to set the receiver test pulses at a desired level.

2. In a communication system for transmitting facsimile signals between a central office and a patron station, a facsimile transmitter at the central office, a telephone network including a first telephone set located at the central office and a second telephone set located at the patron station whereby telephonic communication may be established therebetween, means including impedance means to couple said transmitter to said first telephone set, a rotary drum facsimile transceiver at the patron station, said transceiver including a transmitting amplifier, optical scanning means connected to said transmitting amplifier, a receiving amplifier, stylus scanning means connected to said amplifier, means to couple said transceiver to said second telephone set, means to energize said transceiver, means whereby energization thereof initially energizes said transmitting amplifier and optical scanning means and sets the transceiver up as a transmitter to send test pulses to the central office transmitter, said transmitter including indicating means normally coupled in circuit with said impedance means to respond to the test pulses received from the patron station and means to adjust the level of the test pulses.

3. In a communication system for transmitting facsimile signals between a central office and a patron station, a telephone network including a first telephone set located at the central office and a second telephone set located at the patron station whereby telephone communication may be established therebetween, a facsimile tranceiver at the patron station, means to couple said transceiver to said second telephone set, a facsimile transmitter at the central office, means including impedance means intercoupling said transmitter and said first telephone set, means to energize said transceiver, means whereby energization of the transceiver sends test pulses over the telephone network to the central office transmitter, said transmitter including indicating means normally coupled in circuit with said impedance means to respond to said test pulses received from the patron station, means to vary said impedance means to adjust the level of said test pulses, means to apply a first tone signal to the outgoing line at the central office, means at the patron station responsive to said first tone signal to condition said transceiver as a receiver, means to apply a second tone signal to the outgoing line at the central office and means at the patron station responsive to said second tone signal to initiate scanning of the transceiver.

4. In a system for transmitting facsimile signals between a central office and an outstation, a telephone network including a first telephone set located at the central office and a second telephone set located at the outstation whereby telephonic communication may be established between the central office and the outstation, a facsimile transmitter and a facsimile recorder at the central office, a transmitter coupling device, circuit means connecting said transmitter to said transmitter coupling device, a recorder coupling device, circuit means connecting said recorder to said recorder coupling device, said transmitter coupling device and said recorder coupling device being adapted to be alternately coupled to said first telephone set, a facsimile transceiver at the outstation, a transceiver coupling device, means connecting said transceiver to said transceiver coupling device, said transceiver coupling device being adapted to be selectively coupled to said second telephone set, means to energize said transceiver, means whereby energization thereof initially sets up the transceiver as a transmitter to send test pulses over the telephone network to the central office, said central office transmitter and recorder each having an indicating device adapted to indicate the signal level of said test pulses, each of said circuit means including adjustable impedance means whereby said test pulses may be set at an optimum level.

5. In a system for transmitting facsimile signals between a central office and an outstation, a telephone network including a first telephone set located at the central office and a second telephone set located at the outstation whereby telephonic communication may be established between the central office and the outstation, a facsimile transmitter and a facsimile recorder at the central office, a transmitter coupling device, circuit means connecting said transmitter to said transmitter coupling device, a recorder coupling device, circuit means connecting said recorder to said recorder coupling device, said transmitter coupling device and said recorder coupling device being atlernately coupled to said first telephone set, a rotary drum facsimile transceiver at the outstation, a transceiver coupling device, means connecting said transceiver to said transceiver coupling device, said transceiver coupling device being adapted to be selectively coupled to said second telephone set, means to energize said transceiver, means whereby energization thereof initially sets up the transceiver as a transmitter to send test pulses over the telephone network to the central office, said central office transmitter and recorder each having an indicating device adapted to indicate the signal level of said test pulses, each of said circuit means including adjustable impedance means whereby said test pulses may be set at an optimum level, means connected to said central office transmitter to apply a tone signal to the outgoing line and means at the outstation responsive to said tone signal to condition said transceiver as a receiver.

6. In a communication system for transmitting facsimile signals between a central office and a patron station, a telephone network including a first telephone set located at the central office and a second telephone set located at the patron station, means whereby said network is normally in standby condition for telephonic communication, a facsimile transmitter at the central office, a transmitter coupling device, circuit means interconnecting the transmitter and the coupling device, said coupling device being adapted to be coupled to said first telephone set whereby signal pulses may pass between the transmitter and the telephone network, a facsimile transceiver at the patron station, a transceiver coupling device, circuit means interconnecting the transceiver and the transceiver coupling device, said transceiver coupling device being adapted to be coupled to said second telephone set whereby signal pulses may pass between the transceiver and the telephone network, means to energize said transceiver, means to prevent coupling of said transceiver coupling device and second telephone set when the transceiver is deenergized, means whereby energization of the transceiver initially sets up the transceiver as a transmitter to send test pulses over the telephone network to the central office, said central office transmitter having an indicating device responsive to said test pulses to indicate the level thereof, said circuit means including adjustable impedance means whereby the signal level of the received test pulses may be controlled, signal generating means at the central office, means to connect said signal generating means to the transmitter coupling device, a tuned circuit at the patron station tuned to the frequency of said signal generating device, an electronic discharge device connected to said tuned circuit, and means controlled by said electronic discharge device to cause said transceiver to shut down as a transmitter and set up as a receiver.

7. In a communication system for transmitting facsimile signals between a central office and a patron station, a telephone network including a first telephone handset located at the central office and a second telephone handset and support means located at the patron station whereby telephonic communication may be established therebetween, means whereby the telephone network is in standby condition for telephonic communication when said second handset is resting on its support means, a facsimile transmitter at the central office, a transmitter coupling device, circuit means interconnecting the transmitter and the coupling device, said coupling device being adapted to be coupled to said first telephone handset whereby signal pulses may pass between the transmitter and the telephone network, a facsimile transceiver at the patron station, a transceiver coupling device, circuit means interconnecting the transceiver and the transceiver coupling device, said transceiver coupling device being adapted to be engaged by said second telephone handset whereby signal pulses may pass between the transceiver and the telephone network, means to energize said transceiver, said transceiver coupling device being located adjacent said support means, lifting means connected to said transceiver coupling device to maintain the second telephone handset above its support means during facsimile communication, means to operate said lifting means upon energization of said transceiver, means whereby energization of the transceiver initially sets up the transceiver as a transmitter to send test pulses over the telephone network to the central office, said central office transmitter having an indicating device responsive to said test pulses to indicate the level thereof, said circuit means including adjustable impedance means whereby the signal level of the received test pulses may be controlled, a first and second signal generating means at the central office, means to connect said first and second signal generating means to the transmitter coupling device, a first and second tuned circuit at the patron station tuned to the frequency of said first and second signal generating device respectively, first and second electronic discharge devices connected to said first and second tuned circuits respectively, means controlled by said first electronic discharge device to cause said transceiver to set up as a receiver, means controlled by said second electronic discharge device to start scanning at the transceiver, and means to lower said lifting means to reposition the second telephone handset on its support means upon deenergization of said transceiver.

8. A facsimile system for transmitting facsimile messages over a telephone circuit comprising a facsimile transceiver, a telephone handset, cradle support means for said handset, means whereby the telephone circuit is in standby condition for telephonic communication when said handset is positioned on the support means, means to selectively couple the facsimile transceiver to the telephone circuit for facsimile transmission, switch means to prevent coupling of said facsimile transceiver to the circuit when the handset is positioned on the cradle, means to automatically restore the telephone circuit to standby condition for telephonic communication at the end of facsimile transmission, said last named means including a relay operable upon energization of the facsimile machine.

9. A facsimile system for transmitting facsimile signals over a telephone circuit comprising a facsimile transceiver, telephone apparatus including a handset and handset cradle for telephonic communication over said circuit, said telephone apparatus being normally connected to said circuit, relay means operable when energized to disconnect said telephone apparatus from said circuit and connect the facsimile transceiver thereto, said relay means being connected to the facisimile transceiver whereby termination of facsimile transmission deenergizes the relay means to disconnect the transceiver from said telephone circuit and connect the telephone apparatus thereto and means positioned to be actuated by said telephone hand set to prevent energization of said relay means when the telephone handset is positioned on said cradle.

References Cited in the file of this patent

UNITED STATES PATENTS

| | | |
|---|---|---|
| 2,047,863 | Finch | July 14, 1936 |
| 2,180,397 | Carlisle | Nov. 21, 1939 |
| 2,186,899 | D'Humy | Jan. 9, 1940 |
| 2,533,234 | Edwards | Dec. 12, 1950 |
| 2,539,139 | Jordanoff | Jan. 23, 1951 |
| 2,606,963 | Ridings | Aug. 12, 1952 |